United States Patent
Herrero et al.

(10) Patent No.: US 7,037,868 B2
(45) Date of Patent: May 2, 2006

(54) TRANSPARENT TILE GLAZE

(75) Inventors: Jose Antonio Pascual Herrero, Castello (ES); Juan Uso Villanueva, Castellon (ES); Antonio Manuel Querol Villalba, Castellon (ES)

(73) Assignee: Ferro Corporation, Cleveland, OH (US)

( * ) Notice: Subject to any disclaimer, the term of this patent is extended or adjusted under 35 U.S.C. 154(b) by 30 days.

(21) Appl. No.: 10/732,903

(22) Filed: Dec. 10, 2003

(65) Prior Publication Data

US 2005/0130824 A1 Jun. 16, 2005

(51) Int. Cl.
*C03C 8/02* (2006.01)
*C03C 8/10* (2006.01)
*C03C 8/12* (2006.01)

(52) U.S. Cl. ............... 501/21; 501/22; 501/23; 501/61; 501/62; 501/66; 501/67; 501/70; 501/72; 65/17.3; 65/60.5; 65/60.53; 65/60.8; 427/193; 427/201; 427/419.6

(58) Field of Classification Search ............ 501/21–23, 501/61, 62, 66, 67, 70–72; 65/17.3, 60.5, 65/60.8, 60.53; 427/190, 193, 201, 419.6
See application file for complete search history.

(56) References Cited

U.S. PATENT DOCUMENTS

| | | | |
|---|---|---|---|
| 2,857,664 A | * 10/1958 | Luks et al. | 228/121 |
| 2,918,384 A | * 12/1959 | Beals et al. | 501/22 |
| 3,927,238 A | * 12/1975 | DiMarcello | 428/336 |
| 4,240,837 A | 12/1980 | Votava et al. | |
| 4,282,035 A | * 8/1981 | Nigrin | 501/32 |
| 4,806,334 A | * 2/1989 | Fujinaka et al. | 428/631 |
| 5,200,369 A | * 4/1993 | Clifford et al. | 501/66 |
| 5,348,915 A | 9/1994 | Thometzek | |
| 5,447,891 A | 9/1995 | Spinosa et al. | |
| 5,633,090 A | * 5/1997 | Rodek et al. | 428/428 |
| 6,132,832 A | 10/2000 | Crichton et al. | |
| 6,174,608 B1 | 1/2001 | Bertocchi et al. | |
| 6,348,425 B1 | 2/2002 | Barattini et al. | |

FOREIGN PATENT DOCUMENTS

EP 509792 A * 10/1992

* cited by examiner

*Primary Examiner*—David Sample
(74) *Attorney, Agent, or Firm*—Rankin, Hill, Porter & Clark LLP

(57) ABSTRACT

The present invention provides zinc-free glass frits that can be used to formulate glaze compositions that develop glossy surfaces when fired on ceramic products such as floor tile and wall tile. The zinc-free glass frits include, by weight, from about 50% to about 70% $SiO_2$, from about 5% to about 20% CaO, from about 3% to about 15% $Al_2O_3$, up to about 20% BaO, up to about 15% $B_2O_3$, up to about 10% $K_2O$, up to about 10% $Na_2O$, up to about 10% $ZrO_2$, up to about 5% MgO and up to about 5% PbO and less than 0.5% ZnO. Glaze compositions comprising the zinc-free glass frits can be fired using conventional double fast firing, single fast firing, and gres porcellanato ceramic firing cycles.

6 Claims, No Drawings

TRANSPARENT TILE GLAZE

BACKGROUND OF THE INVENTION

1. Field of Invention

The present invention concerns zinc-free glass frits that can be used to formulate ceramic glaze compositions that develop glossy surfaces when fired on ceramic products such as architectural tile.

2. Description of Related Art

Ceramic products such as architectural tiles, for example, are formed from batches of natural or synthetic raw materials such as clay, kaolin, quartz, feldspar, wollastonite, talc, calcium carbonate, dolomite, calcined kaolin, hard clay, chamotte-grog, oxides such as alumina, silica, corundum and mixtures of the foregoing. Binders and other additives may also be employed to increase the mechanical strength of the raw ("unfired") ceramic bodies. Once formed, the raw ceramic bodies must be fired to form biscuits that are hard, tough, and brittle.

Glaze compositions, which typically comprise one or more glass frits and other optional raw materials, pigments and additives, are often applied to and fired on the ceramic bodies to impart a protective surface to the ceramic product. A variety of glazing and firing methods are known in the art, including a single fire approach in which the glaze composition and the raw ceramic body are fired simultaneously to form a fired ceramic product having a protective vitreous surface layer bonded thereto. In addition to the single fire approach, it is also well known in the art to produce glazed ceramic tiles by a double fire approach. In the double fire approach, the glaze composition is applied to a once-fired biscuit, which is then subjected to a second firing operation in order to produce the glazed ceramic product.

BRIEF SUMMARY OF THE INVENTION

The present invention provides a zinc-free glass frit that can be used to formulate glaze compositions that develops glossy surfaces when fired on ceramic products such as floor tile and wall tile. Glaze compositions comprising the zinc-free glass frit according to the invention can be fired on ceramic products (e.g., floor tile and wall tile) using conventional double fast firing, single fast firing, and gres porcellanato ceramic firing cycles.

The zinc-free glass frits according to the invention comprise, by weight, from about 50% to about 70% $SiO_2$, from about 5% to about 20% CaO, from about 3% to about 15% $Al_2O_3$, up to about 20% BaO, up to about 15% $B_2O_3$, up to about 10% $K_2O$, up to about 6% $Na_2O$, up to about 10% $ZrO_2$, up to about 5% MgO and up to about 5% PbO and less than 0.5% ZnO. More preferably, the zinc-free glass frits according to the invention comprise from about 52.0% to about 64% $SiO_2$, from about 8% to about 15% CaO, from about 4% to about 11% $Al_2O_3$, from about 7% to about 15% BaO, up to about 13% $B_2O_3$, from about 2% to about 8% $K_2O$, up to about 4% $Na_2O$, up to about 8% $ZrO_2$ and up to about 3% MgO. Most preferably, the zinc-free glass frits according to the invention comprise from about 53% to about 61% $SiO_2$, from about 10% to about 12% CaO, from about 5.5% to about 9% $Al_2O_3$, from about 8% to about 12% BaO, up to about 12% $B_2O_3$, from about 3.5% to about 6% $K_2O$, up to about 2% $Na_2O$, up to about 8% $ZrO_2$ and up to about 2% MgO.

Glossy glaze compositions comprising the zinc-free glass frits according to the invention tend to exhibit a higher expansion coefficient than conventional glossy glaze formulations that include zinc oxide-containing glass frits. This advantageously facilitates the formation of glazed surfaces that are smoother than can be obtained using conventional glaze compositions, particularly in single fast firing cycles.

Additionally, when the glass frit compositions according to the invention include barium oxide but no zinc oxide and are used to formulate a glaze, it is possible to obtain a yellow coloration in the glaze simply by application of an ink composition comprising $Cr^{+3}$ ions and no solids. The yellow color thus obtained is superior in terms of stability than the Ti—Sb—Cr yellow-buff colors that can be obtained using conventional glaze compositions.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The novel glass frits according to the present invention are "zinc-free." As used throughout this specification and in the claims below, the term "zinc-free" means that no zinc compounds have been intentionally smelted into the glass frit composition and that the resulting glass frit composition comprises less than about 0.5% by weight ZnO.

The composition of the zinc-free glass frits according to the invention is shown in weight percent in Table 1 below (where the symbol "~" means "about"):

TABLE 1

| Component | Allowable Range | Preferred Range |
|---|---|---|
| $SiO_2$ | ~50% to ~70% | ~52.0% to ~64% |
| CaO | ~5% to ~20% | ~8% to ~15% |
| $Al_2O_3$ | ~3% to ~15% | ~4% to ~11% |
| BaO | up to ~20% | ~7% to ~15% |
| $B_2O_3$ | up to ~15% | up to ~13% |
| $K_2O$ | up to ~10% | ~2% to ~8% |
| $Na_2O$ | up to ~8% | up to ~4% |
| $ZrO_2$ | up to ~10% | up to ~8% |
| MgO | up to ~5% | up to ~3% |
| PbO | up to ~5% | — |
| ZnO | less than ~0.5% | — |

In addition to the oxides shown in Table 1 above, the following other oxides can also be present, by weight, in the frits: SrO up to 0.5%; $Li_2O$ up to 0.5%; $Fe_2O_3$ up to 0.2%; and $TiO_2$ up to 0.2%. Generally speaking, the sum of oxides other than those listed in Table 1 should be kept to less than about 1.5% of the total glass frit composition, by weight.

The glass frits can be prepared using conventional glass melting techniques. Typically, amounts of raw materials (oxides, carbonates etc.) are selected to obtain the desired final composition of the glass. These selected raw materials are then smelted at a temperature of from about 1450° C. to about 1550° C. in a continuous or rotary smelter, and then the melt is cooled using a water bath or water-cooled rollers. The glass frit is typically milled to a suitable fineness for use in the formulation of glaze compositions.

The glass frits can be used to formulate glaze compositions for producing a glossy surface on ceramic products. Alternatively, the glass frits can be used as a substantial component of glaze compositions for producing a matte surface on ceramic products. The glass frits are also suitable for use in the formation of porcelain enamel compositions.

To form a glaze composition, the glass frit(s) is typically combined with clay, kaolin and/or other raw materials and milled with water. In addition to the solids, the glaze composition may include other additives such as deflocculants, binders and pigments in order to obtain the suitable conditions for the application and different color tonalities.

Glaze compositions comprising the zinc-free glass frit(s) according to the invention can be fired on ceramic products (e.g., floor tile and wall tile) using conventional double fast firing, single fast firing, and gres porcellanato ceramic firing cycles. Glossy glaze compositions comprising the zinc-free glass frit(s) according to the invention tend to exhibit a higher dilation coefficient than conventional glossy glaze formulations that include zinc oxide-containing glass frits. This advantageously facilitates the formation of glazed surfaces that are smoother than can be obtained using conventional glaze compositions, particularly in single fast firing cycles.

Another advantage provided by the glass frit compositions according to the present invention is that they can be used to produce high quality yellow coloration in the glaze using the technology disclosed in Garcia Sainz et al., U.S. Pat. No. 6,402,823, which is hereby incorporated by reference in its entirety. In the prior art, in order to produce a satisfactory yellow coloration, quantities of $TiO_2$ had to be incorporated into the glaze composition so that a Ti—Sb—Cr yellow-buff coloration would develop upon firing. However, the glass frit compositions according to the present invention facilitate the formation of a very satisfactory yellow coloration merely by application of inks containing $Cr^{+3}$ ions, and no solids. The absence of ZnO in the glass frit(s) in the glaze composition facilitates interaction between the BaO and $Cr^{+3}$, which forms the desired yellow coloration in the resulting fired glaze.

It will be appreciated that ceramic products coated with the glaze compositions according to the invention can be decorated using conventional decoration compositions and systems. For example, decorative inks can be applied to the glossy glaze compositions using an inkjet system or using conventional decoration systems such as, for example, flat screen printing, roll screen printing, flexography, and photogravure.

The following examples are intended only to illustrate the invention and should not be construed as imposing limitations upon the claims.

EXAMPLE 1

Glass frit A was prepared using conventional glass melting techniques to have the composition shown in Table 2 below (amount in weight percent):

TABLE 2

| Component | Amount |
| --- | --- |
| $SiO_2$ | 57.65 |
| BaO | 11.41 |
| CaO | 11.21 |
| $Al_2O_3$ | 7.56 |
| $B_2O_3$ | 5.62 |
| $K_2O$ | 5.34 |

TABLE 2-continued

| Component | Amount |
| --- | --- |
| MgO | 0.81 |
| $Na_2O$ | 0.40 |
| Total | 100 |

Glossy Glaze Composition A was formed by milling 91 parts by weight of Glass Frit A with 9 parts by weight of kaolin and with conventional milling additives for single fast firing to a fineness of about 5 grams residue being retained on a 325 mesh sieve from a 100 cubic centimeter sample. Glossy Glaze Composition A was then applied using conventional production conditions for single fast firing monoporosa, namely: (1) a raw ceramic tile body was formed with a press; (2) an engobe was applied to the raw ceramic tile body using a conventional bell application technique; (3) Glossy Glaze Composition A was applied using a conventional bell application technique; and (4) a decoration was applied over Glossy Glaze Composition A via inkjet printing using a Kerajet machine and the inks described in U.S. Pat. No. 6,402,823 and U.S. patent application Ser. No. 2002/068131A1. The raw ceramic tile was then fired using a single fast firing monoporosa cycle consisting of 45 minutes at 1120° C.

EXAMPLE 2

Glass frit B was prepared using conventional glass melting techniques to have the composition shown in Table 3 below (amount in weight percent):

TABLE 3

| Component | Amount |
| --- | --- |
| $SiO_2$ | 54.81 |
| BaO | 11.32 |
| CaO | 11.12 |
| $B_2O_3$ | 10.53 |
| $Al_2O_3$ | 6.01 |
| $K_2O$ | 4.80 |
| MgO | 0.80 |
| $Na_2O$ | 0.61 |
| Total | 100 |

Glossy Glaze Composition B was formed by milling 93 parts by weight of Glass Frit B with 7 parts by weight of kaolin and with conventional milling additives for double fast firing to a fineness of about 5 grams residue being retained on a 325 mesh sieve from a 100 cubic centimeter sample. Glossy Glaze Composition B was then applied using conventional production conditions for double fast firing, namely: (1) a press-formed ceramic biscuit was once-fired; (2) an engobe was applied to the once-fired ceramic biscuit using a conventional bell application technique; (3) Glossy Glaze Composition B was applied using a conventional bell application technique; and (4) a decoration was applied over Glossy Glaze Composition B via inkjet printing using a Kerajet machine and the inks described in U.S. Pat. No. 6,402,823 and U.S. patent application Ser. No.

2002/068131A1. The raw ceramic tile was then fired using a double fast firing cycle consisting of 40 minutes at 1040° C.

EXAMPLE 3

Glass frit C was prepared using conventional glass melting techniques to have the composition shown in Table 4 below (amount in weight percent)

TABLE 4

| Component | Amount |
| --- | --- |
| $SiO_2$ | 61.09 |
| BaO | 11.43 |
| CaO | 11.23 |
| $Al_2O_3$ | 8.58 |
| $K_2O$ | 5.35 |
| $B_2O_3$ | 1.41 |
| MgO | 0.81 |
| $Na_2O$ | 0.10 |
| Total | 100 |

Glossy Glaze Composition C was formed by milling 88 parts by weight of Glass Frit C with 12 parts by weight of kaolin and with conventional milling additives for single fast firing to a fineness of about 5 grams residue being retained on a 325 mesh sieve from a 100 cubic centimeter sample. Glossy Glaze Composition C was then applied using conventional production conditions for gres porcellanato, namely: (1) a gres porcellanato tile body was formed with a press; (2) an engobe was applied to the gres porcellanato tile body using a conventional bell application technique; (3) Glossy Glaze Composition C was applied using a conventional bell application technique; and (4) a decoration was applied over Glossy Glaze Composition C via inkjet printing using a Kerajet machine and the inks described in U.S. Pat. No. 6,402,823 and U.S. patent application Ser. No. 2002/068131A1. The raw ceramic tile was then fired using a gres porcellanato firing cycle consisting of 60 minutes at 1200° C.

EXAMPLE 4

Glass frit D was prepared using conventional glass melting techniques to have the composition shown in Table 5 below (amount in weight percent):

TABLE 5

| Component | Amount |
| --- | --- |
| $SiO_2$ | 53.50 |
| $ZrO_2$ | 7.50 |
| BaO | 8.70 |
| CaO | 11.20 |
| $B_2O_3$ | 5.60 |
| $Al_2O_3$ | 8.00 |
| $K_2O$ | 4.30 |
| MgO | 0.80 |
| $Na_2O$ | 0.40 |
| Total | 100 |

Glossy Glaze Composition D was formed by milling 91 parts by weight of Glass Frit D with 9 parts by weight of kaolin and with conventional milling additives for single fast firing to a fineness of about 5 grams residue being retained on a 325 mesh sieve from a 100 cubic centimeter sample. Glossy Glaze Composition D was then applied using conventional production conditions for monoporosa single fast firing, namely: (1) a raw ceramic tile body was formed with a press; (2) an engobe was applied to the raw ceramic body using a conventional bell application technique; (3) Glossy Glaze Composition D was applied using a conventional bell application technique; and (4) a decoration was applied over Glossy Glaze Composition D via inkjet printing using a Kerajet machine and the inks described in U.S. Pat. No. 6,402,823 and U.S. patent application Ser. No. 2002/068131A1. The raw ceramic tile was then fired using a single fast firing monoporosa cycle consisting of 45 minutes at 1120° C.

EXAMPLE 5

It will be appreciated that glossy glaze compositions suitable for different firing cycles can be obtained simply by mixing different frits according to the invention together. For example, a Glossy Glaze Composition can be formed as in Example 2 using a 50:50 weight ratio blend of Glass Frit A and Glass Frit B. This allows for a slightly higher temperature double fast firing cycle consisting of 40 minutes at 1080° C. Similarly, a Glossy Glaze Composition can be formed on a raw floor tile body using the same conditions as in Example 1, except that a 50:50 weight ratio of a blend of Glass Frit A and Glass Frit C is used. This allows for a slightly higher temperature single fast floor tile cycle consisting of 45 minutes at 1140° C.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming a protective glaze surface on an architectural tile comprising:
   providing a ceramic body;
   applying a glaze composition to the ceramic body, the glaze composition comprising a zinc-free glass frit consisting essentially of, by weight, from about 50% to about 70% $SiO_2$, from about 5% to about 20% CaO, from about 3% to about 15% $Al_2O_3$, BaO, provided that the content of BaO does not exceed about 20%, up to about 15% $B_2O_3$, up to about 10% $K_2O$, up to about 6% $Na_2O$, up to about 10% $ZrO_2$, up to about 5% MgO and up to about 5% PbO; and
   firing the ceramic body to fuse the glaze composition to a surface thereof.

2. The method according to claim 1 wherein the applied glaze composition and ceramic body are co-fired during a single fast firing cycle at a temperature of from about 1080° C. to about 1180° C.

3. The method according to claim 1 wherein the glaze composition is applied to the ceramic body after the ceramic body has been once-fired, and wherein the applied glaze composition and the once-fired ceramic body are co-fired during a second firing in a double fast firing cycle at a temperature of from about 1000° C. to about 1150° C.

4. The method according to claim 1 wherein the glaze composition and the ceramic body are co-fired in a single ceramic firing cycle at a temperature of from about 1160° C. to about 1250° C.

5. The method according to claim 1 wherein:

the zinc-free glass frit comprises BaO;

an ink composition for decorating ceramic products is applied to the applied glaze composition prior to firing; and a coloration develops in the protective glaze surface.

6. A method of forming a protective glaze surface on an architectural tile comprising:

providing a ceramic body;

applying a glaze composition to the ceramic body, the glaze composition comprising a zinc-free glass frit comprising BaO;

applying an ink composition comprising $Cr^{+3}$ ions to the applied glaze composition prior to firing; and firing the ceramic body to fuse the glaze composition to a surface thereof, wherein a yellow coloration develops in the protective glaze surface where the ink was applied and fired.

* * * * *